US011343029B2

(12) United States Patent
Shi et al.

(10) Patent No.: US 11,343,029 B2
(45) Date of Patent: May 24, 2022

(54) METHOD AND APPARATUS FOR IMPROVING RESOURCE EFFICIENCY IN A WIRELESS COMMUNICATION SYSTEM

(71) Applicant: Nokia Technologies Oy, Espoo (FI)

(72) Inventors: Shenglin Shi, Zhejiang (CN); Zhijun Liao, Zhejiang (CN); Yaling Qu, Zhejiang (CN); Leilei Li, Zhejiang (CN)

(73) Assignee: Nokia Technologies Oy, Espoo (FI)

( * ) Notice: Subject to any disclaimer, the term of this patent is extended or adjusted under 35 U.S.C. 154(b) by 27 days.

(21) Appl. No.: 16/652,512

(22) PCT Filed: Nov. 30, 2017

(86) PCT No.: PCT/CN2017/113894
§ 371 (c)(1),
(2) Date: Mar. 31, 2020

(87) PCT Pub. No.: WO2019/104624
PCT Pub. Date: Jun. 6, 2019

(65) Prior Publication Data
US 2020/0287668 A1 Sep. 10, 2020

(51) Int. Cl.
*H04L 1/18* (2006.01)
*H04L 1/08* (2006.01)
(Continued)

(52) U.S. Cl.
CPC .............. *H04L 1/1887* (2013.01); *H04L 1/08* (2013.01); *H04L 1/1893* (2013.01);
(Continued)

(58) Field of Classification Search
CPC .................................................. H04L 1/1887
See application file for complete search history.

(56) References Cited

U.S. PATENT DOCUMENTS 9,535,740 B1 * 1/2017 Graham ................ G06F 9/5077
2006/0067256 A1 * 3/2006 Alazraki ............... H04L 1/0003
370/300
(Continued)

FOREIGN PATENT DOCUMENTS

CN 104811995 A 7/2015
CN 107078863 A 8/2017
(Continued)

OTHER PUBLICATIONS

Ericsson, "Increased PUSCH spectral efficiency for MTC," $3^{rd}$ Generation Partnership Project (3GPP), 3GPP TSG-RAN WG1 Meeting #91, R1-1719354, pp. 1-18, Reno, Nevada, USA Nov. 27-Dec. 1, 2017.
(Continued)

*Primary Examiner* — John D Blanton
(74) *Attorney, Agent, or Firm* — Fay Sharpe LLP

(57) ABSTRACT

Embodiments of the present disclosure relate to methods, apparatuses and computer program products for improving resource efficiency in a wireless communication system. A method implemented at a network device comprises: setting, for a terminal device, a first number of repetitions to be used for a first transmission from the terminal device; detecting the first transmission from the terminal device based on a second number of repetition; in response to detecting the first transmission correctly based on the second number of repetitions, comparing the second number with the first number; and in response to the second number being less than the first number, identifying a resource for remaining repetitions after the second number of repetitions of the first transmission as being reusable for a further terminal device. Embodiments of the present disclosure may improve resource usage efficiency of the wireless communication system, and at the same time support coverage enhancement.

23 Claims, 4 Drawing Sheets

(51) Int. Cl.
*H04L 5/00* (2006.01)
*H04W 72/04* (2009.01)
*H04W 72/08* (2009.01)

(52) U.S. Cl.
CPC ......... *H04L 5/0053* (2013.01); *H04W 72/042* (2013.01); *H04W 72/082* (2013.01)

(56) References Cited

U.S. PATENT DOCUMENTS

| | | | |
|---|---|---|---|
| 2007/0250638 A1* | 10/2007 | Kiran | ........................ H04L 5/04 709/236 |
| 2015/0236814 A1* | 8/2015 | Liu | ........................ H04L 1/203 370/252 |
| 2017/0272895 A1 | 9/2017 | Park et al. | |
| 2017/0303248 A1* | 10/2017 | Chatterjee | ............. H04L 1/1861 |
| 2018/0249358 A1 | 8/2018 | Ratasuk et al. | |

FOREIGN PATENT DOCUMENTS

| | | |
|---|---|---|
| CN | 107135473 A | 9/2017 |
| EP | 32616149 A1 | 9/2017 |
| EP | 32616149 B1 | 5/2020 |
| WO | WO 2014/110805 A1 | 7/2014 |

OTHER PUBLICATIONS

"3$^{rd}$ Generation Partnership Project; Technical Specification Group Radio Access Network; Evolved Universal Terrestrial Radio Access (E-UTRA); Physical layer procedures; (Release 15)", 3GPP TS 36.213 V15.0.0 pp. 422-479, (Dec. 2017).

International Search Report for PCT/CN2017/113894 dated Sep. 5, 2018.

"3$^{rd}$ Generation Partnership Project; Technical Specification Group Radio Access Network; Evolved Universal Terrestrial Radio Access (E-UTRA); Physical layer procedures; (Release 13)", 3GPP TS 36.213 V13.4.0 pp. 337-375, (Dec. 2016).

3$^{rd}$ Generation Partnership Project; 3GPP TSG RAN WG1 Meeting #74bis Oct. 7-11, 2013; R1-134552' Review of TR 25.702 v12.0.0; 28 pgs pub Sep. 28, 2013.

* cited by examiner

METHOD AND APPARATUS FOR IMPROVING RESOURCE EFFICIENCY IN A WIRELESS COMMUNICATION SYSTEM

FIELD

The non-limiting and example embodiments of the present disclosure generally relate to a technical field of wireless communication, and specifically to methods, apparatuses and computer program products for improving resource efficiency in a wireless communication system.

BACKGROUND

This section introduces aspects that may facilitate a better understanding of the disclosure. Accordingly, the statements of this section are to be read in this light and are not to be understood as admissions about what is in the prior art or what is not in the prior art.

Driven by consumer demands, wireless communication technologies are developed constantly to provide various services. Currently, a new fifth generation (5G) wireless communication technique is being studied in the third generation partnership project (3GPP). According to a standpoint of the International Telecommunication Union (ITU), there are three typical application scenarios to be supported in a 5G wireless communication system, namely, enhanced mobile broadband (eMBB) communication, ultra-reliable low-latency communications (URLLC) and massive machine type communication (mMTC).

Narrowband Internet of Things (NB-IoT) is a technology designed for support of low throughput, low complexity and low energy consumption MTC. NB-IoT needs to support a massive number of connections and extended coverage up to 164 dB Maximum Coupling Loss (MCL) at the same time. However, with only one Physical Resource Block (PRB) (corresponding to 180 kHz, for example) allocated for a NB-IoT cell in both downlink (DL) and uplink (UL), it is a big challenge to achieve massive connections and extended coverage at the same time.

SUMMARY

Various embodiments of the present disclosure mainly aim at providing methods, apparatuses and computer program products for improving resource efficiency in a wireless communication system. In some embodiments, UL capacity of a wireless communication network may be improved and at the same time coverage enhancement is supported. Other features and advantages of embodiments of the present disclosure will be understood from the following description of various embodiments when read in conjunction with the accompanying drawings, which illustrate, by way of example, the principles of embodiments of the present disclosure.

In a first aspect of the disclosure, there is provided a method implemented at a network device. The method comprises: setting, for a terminal device, a first number of repetitions to be used for a first transmission from the terminal device; detecting the first transmission from the terminal device based on a second number of repetitions; in response to detecting the first transmission correctly based on the second number of repetitions, comparing the second number with the first number; and in response to the second number being less than the first number, identifying a resource for remaining repetitions after the second number of repetitions of the first transmission as being reusable for a further terminal device.

In an embodiment, in response to the second number being less than the first number, the network device may cease detection of the first transmission from the terminal device.

In another embodiment, identifying the resource for the remaining repetitions as being reusable may include identifying the resource as a reusable resource if the first number is above a first threshold.

In some embodiments, identifying the resource for the remaining repetitions as being reusable may comprise identifying the resource as a reusable resource if the number of the remaining repetitions is no less than a second threshold.

In an embodiment, identifying the resource for the remaining repetitions as being reusable may comprise adding the resource for the remaining repetitions into a resource pool for being reused by the further terminal device.

In another embodiment, the method may further comprise scheduling a second transmission from the further terminal device using the resource identified as reusable.

In still another embodiment, scheduling the second transmission may comprise determining whether the further terminal device satisfies a resource reuse condition based on a first signal power associated with the further terminal device and a second signal power associated with the terminal device; and in response to determining that the further terminal device satisfies the resource reuse condition, scheduling the further terminal device to transmit using the reusable resource.

In a further embodiment, the first signal power may include an average signal power from a first set of terminal devices that are served by the network device and have a same repetition level as the further terminal device, and wherein the second signal power may include an average signal power from a second set of terminal devices that are served by the network device and have a same repetition level as the terminal device.

In some embodiments, determining whether the further terminal device satisfies the resource reuse condition may comprise: obtaining a signal to interference and noise ratio (SINR) of the further terminal device, wherein the first transmission from the terminal device is considered as an interference; and in response to the SINR of the further terminal device being above a threshold SINR, determining that the further terminal device satisfies the resource reuse condition.

In an embodiment, the method may further comprise determining a link adaptation parameter for the further terminal device based on interference from the first transmission.

In another embodiment, determining a link adaptation parameter for the further terminal device may comprise determining a compensation factor for adjusting a transmission parameter for the further terminal device. In a further embodiment, the transmission parameter for the further terminal device may include at least one of: a modulation and coding scheme, and a repetition level.

In a second aspect of the disclosure, there is provided a network device. The network device comprises a processor and a memory and said memory contains instructions executable by said processor whereby said network device is operative to carry out a method according to the first aspect of the present disclosure.

In a third aspect of the disclosure, there is provided a computer program. The computer program comprises instructions which, when executed by at least one processor of a network device, causes the network device to carry out a method according to the first aspect of the present disclosure.

In a fourth aspect of the disclosure, there is provided a computer readable medium having computer program stored thereon which, when executed by at least one processor of a network device, causes the network device to carry out the method according to the first aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
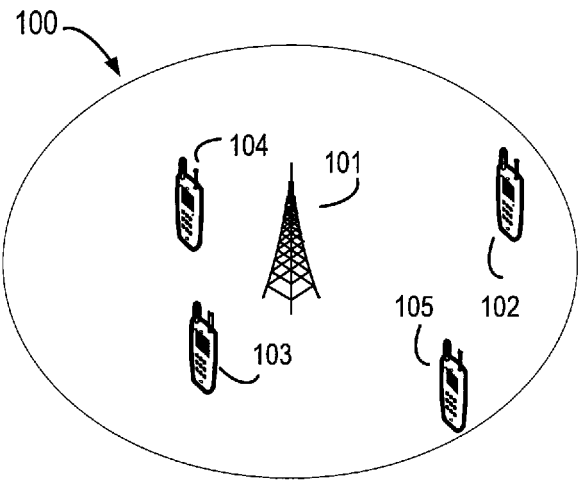
FIG. 1 illustrates an example wireless communication network in which embodiments of the present disclosure may be implemented.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Though specific values for some parameters may be provided in some embodiments, it should be appreciated that these values are just examples, and embodiments are not limited thereto. Instead, depending on techniques, standards and communication scenarios involved in the embodiments, other values may be used.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device in this case may be a machine-to-machine (M2M) device, which may in a 3GPP context be referred to as a MTC device. As one particular example rather than limitation, the terminal device may be a UE implementing the 3GPP NB-IoT standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a DL transmission refers to a transmission from a network device to UE, and an UL transmission refers to a transmission in an opposite direction.

FIG. 1 illustrates an example wireless communication network 100 in which embodiments of the present disclosure may be implemented. As shown, the wireless communication network 100 may include one or more network devices, for example, network device 101. A network device may be in a form of a base station (BS), a Node B (NB), an evolved NB (eNB), a gNB, a virtual BS, a Base Transceiver Station (BTS), or a Base Station Subsystem (BSS), AP and the like.

In this example, network device 101 provides radio connectivity to a set of UEs 102-105 within its coverage. It should be appreciated that in some embodiments, the network device may provide service to less or more UEs.

In some embodiments, one or more of the UE 102-105 may be a MTC device requiring coverage enhancement. For instance, UE 102 may be a meter deployed in a basement, and as a result it may experience large penetration loss during its communication with a base station. In 3GPP, two key technologies have been proposed to achieve extended coverage up to 164 dB MCL. One of the techniques is Power Spectral Density (PSD) boosting, where transmission power is concentrated in less resources in the frequency domain. This technique may be used for coverage extension of DL and/or UL channels in a NB-IoT standalone mode. The other technique being proposed is repetition, where gain in coverage is achieved through combination of signals from multiple transmissions.

In 3GPP specification TS36.213 V13.4.0, repetition configurations, as shown in Table 1, are defined for Narrowband Physical Uplink Shared Channel (NPUSCH), where $I_{Rep}$ denotes an index for a repetition configuration and $N_{Rep}$ denotes the number of repetitions corresponding to the index $I_{Rep}$. According to Table 1, the maximum number of repetitions for NPUSCH of a terminal device is 128, which means that a terminal device with bad radio condition and a corresponding configuration of $N_{Rep}$=128 consumes 128 times of NPUSCH resources compared to a UE with good radio condition and a corresponding configuration of $N_{Rep}$=1.

TABLE 1

Number of repetitions ($N_{Rep}$) for NPUSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Therefore, UEs with bad channel condition may consume most of the radio resources, resulting in reduced capacity of the wireless communication system. As an example, if we conduct a performance test with {34, 4, and 1} UEs deployed at {good, middle, bad} points in one NB-IoT cell respectively, the average number of UL repetitions of {1, 4, 128} assumed for UEs with {good, middle, bad} conditions, and same traffic model adopted for all UEs, then a rough estimation of NPUSCH resource consumption by UEs with {good, middle, bad} conditions will be around {19%, 9%, 72%} for UL respectively. That is, one UE with bad channel condition consumes 72% of the system resource in UL.

To increase efficiency of resource usage, one solution is to deploy less UEs with extremely bad coverage level in a cell. However, in some scenarios, it is inevitable to locate some UEs (e.g., some meters) in a position with large penetration loss.

Another solution for resource efficiency improvement is to improve receiver sensitivity so as to achieve a 164 dB gain with less number of repetitions. However, such a solution means increased cost of the receiver.

To solve at least part of the problems, methods, apparatus and computer products have been proposed herein. Generally speaking, in some embodiments, efficiency of resource usage is improved by reusing some resource configured for repetition. The resource reuse enables the network to support more wireless connections, and provide enhanced coverage at the same time.

In some embodiments, for an UL transmission configured with a large number of repetitions, for example 128, if the receiver device can decode transmitted UL signals (e.g., UL MAC PDU) correctly with first several (e.g., 65 to 127) repetitions less than 128, later remaining UL transmission repetitions from the UE is not required, and related UL resource for the repetition may be reused by other UE(s) at good position (s) (i.e., with good channel condition). Since path loss of the UL channel between a UE with large repetition number (corresponding to bad channel condition) and the base station is large, the transmission of remaining repetitions from the UE may be considered as noise for other UE(s) with good radio channel condition if the other UE(s) is scheduled to reuse the resource of the remaining repetitions.

In some further embodiments, measurement (for example but not limited to Cell level measurement of signal power level) may be performed to decide which UE is to be scheduled for reusing the resource of remaining repetitions. Optionally, compensation in term of link adaptation may be applied to the scheduled UE.

Figure 2:
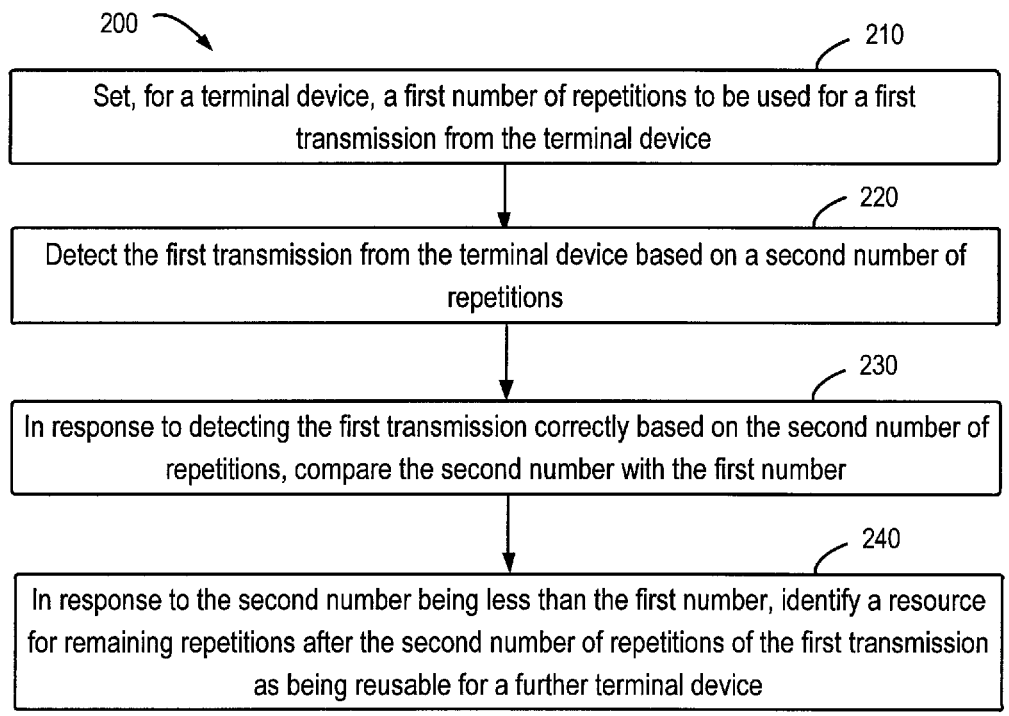
FIG. 2 illustrates a flow chart of a method in a network device according to an embodiment of the present disclosure.

In the following, some example embodiments of the present disclosure will be described with reference to FIGS. 2-5. Reference is first made to FIG. 2 which shows a flowchart of a method 200 implemented at a network device, for example, the network device 101 in FIG. 1. For ease of discussion, the method 200 will be described below with reference to network device 101 and the communication network 100 illustrated in FIG. 1. However, embodiments of the present disclosure are not limited thereto.

At block 210, the network device 101 sets, for a terminal device (for example, UE 102 in FIG. 1), a first number of repetitions to be used for a first transmission from the terminal device. As an example, the network device 101 may set the first number of repetitions for the UE 102 based on its channel condition which may be reported from the UE 102, and/or measured by the network device 101. The first number of repetitions configured at block 210 may be one of the $N_{rep}$ shown in Table 1, (e.g., 128).

In some embodiments, a conventional scheduler may be adopted at block 210 to schedule the terminal device 102, based on, for example buffer status report (BSR), and to determine modulation and coding scheme (MCS) and the number of repetition for the terminal device 102 based on a link adaptation (LA) algorithm.

In some embodiments, the first transmission may be UL Physical Uplink Shared Channel (PUSCH) or NPUSCH transmission, especially NPUSCH transmission with format 1, i.e., NPUSCH carrying data. However, NPUSCH transmission with format 2, i.e., NPUSCH carrying acknowledgement (ACK)/negative acknowledgement (NACK), is not excluded.

At block 220, the network device 101 detects the first transmission from the terminal device 102 based on a second number of repetitions. The second number of repetitions may be all or only a portion of the first number of repetitions.

As an example rather than limitation, the network device 101 may detect the first transmission on a per repetition basis. For instance, the network device may decode the UL MAC PDU carried in the first transmission (e.g., PUSCH) at the end of each repetition. From the second repetition, the network device may decode the UL MAC PDU carried in the first transmission based on a soft-bit combination for PUSCH. At the end of the ith repetition of the first transmission, the network device 101 may combine the ith repetition received with one or more repetitions previously received to obtain a detection result. It enables to the network device to correctly detect the first transmission based on least number of repetitions.

In another embodiment, the network device 101 may detect the first transmission at the end of every N>1 repetitions. For example, the network device 101 may detect the first transmission after receiving N=10 repetitions. If the detection successful, the network device 101 may stop the detection; otherwise, the network device 101 continues receiving the following 10 repetitions, and combines the 20 repetitions to get a detection result. Embodiments are not limited to any specific value of N, and the network device may choose the value for N based on need. For instance, the network device may choose a proper value of N in order to get a balance between detection latency and detection complexity or power consumption.

Figure 3:
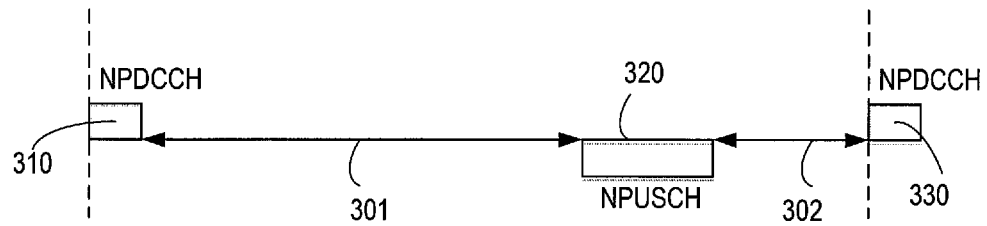
FIGS. 3-4 illustrate examples of timing for communication between a network device and a terminal device according to an embodiment of the present disclosure.

FIG. 3 illustrates schematically timing for the network device 101 to detect NPUSCH transmission with format 1 from the terminal device 102. In the example shown in FIG. 3, the network device 101 schedules a PUSCH transmission of the terminal device 102 via downlink control information (DCI) in NPDCCH 310. The repetition number $N_{rep}$ and MCS for the NPUSCH transmission may be determined using any suitable LA algorithm at the network device 101, and sent to the terminal device 102 through an information field of repetition number in the DCI (e.g., DCI format N1). UE 102 transmits with the NPUSCH format 1 based on configured transmission parameters. Several milliseconds (denoted as 301 in FIG. 3) later, after the transmission of NPDCCH 310, the network device 101 detects the NPUSCH 320. The exact delay 301 is configurable via the NPDCCH DCI and may be, for example but not limited to, 8, 16, 32 or 64 ms. For instance, the network device 101 may detect the PUSCH 320 on a per N-repetition basis, N may be 1 or a larger integer. As shown in FIG. 3, after another delay 302 up to 3 ms following the PUSCH transmission 320, the network device 101 may schedule another PUSCH via NPDCCH 330.

Figure 4:
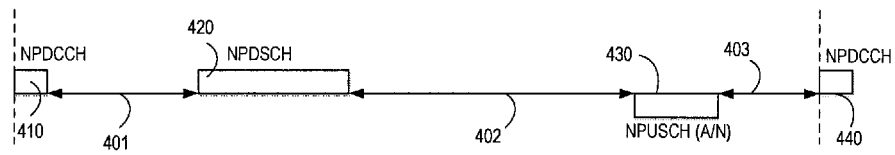

FIG. 4 schematically illustrates timing for the network device 101 to detect NPUSCH transmission with format 2 from the terminal device 102. In this example, the network device 101 schedules NPDSCH transmission through a DCI in PDCCH 410, and transmits PDSCH 420 (4+ $K_{delay}$) ms (401) later after the PDCCH 420, where $K_{delay}$ is configurable via the DCI in PDCCH 410. Then (12+T1) ms (402) later, terminal device 102 transmits an ACK/NACK in NPUSCH 430 with format 2. The value of T1 may be configured in the DCI in PDCCH 410, and may depend on the subcarrier space (SCS). For example, T1 may be 0 or 8 ms for a 3.75 Hz SCS. In another embodiment, T1 may be 0, 2, 4, or 5 ms for 15 Khz SCS. In an embodiment, the network device 101 may detect the NPUSCH in a way as that described with reference to block 220 of FIG. 2. In another embodiment, to guarantee a better performance for ACK/NACK, the network device 101 may detect the NPUSCH 430 based on all the configured first number of transmission repetitions, rather than only based on a portion of the first number of repetitions.

In some embodiments, the number of repetitions $N_{Rep}^{AN}$ configured for NPUSCH format 2 is given by a higher layer parameter ack-NACK-NumRepetitions-Msg4, if the NPUSCH carries ACK/NACK for a MSG4 associated Narrowband Physical Downlink Shared channel (NPDSCH) transmission, and is given by a higher layer parameter ack-NACK-NumRepetitions otherwise. As shown in FIG. 4, after a delay 403 up to 3 ms following the NPUSCH transmission, the network device 101 may schedule another PDSCH via NPDCCH 440.

Now referring back to FIG. 2, at block 230, in response to detecting the first transmission correctly based on the second number of repetitions, the network device 101 compares the second number with the first number.

At block 240, in response to the second number being less than the first number, the network device 101 identifies a resource for remaining repetitions after the second number of repetitions of the first transmission as being reusable for a further terminal device (e.g., UE 103 shown in FIG. 1).

For example, if at block 230 the network device 101 detects the first transmission correctly based on first 50 repetitions which is less than the total 128 repetitions configured for the terminal device 102, then at block 240, the network device may identify a resource for the following 128−50=78 remaining repetitions as a resource reusable for one or more other terminal devices.

With method 200, resource usage efficiency of the wireless communication system can be improved, since some resource configured for the repetitive transmission of terminal device 102 may be reused by other terminal devices after the transmission from the terminal device 102 is detected correctly by the network device 101.

In some embodiments, in response to detecting the first transmission correctly based on the second number of repetition (e.g., 50 repetitions) and the second number being less than the configured first number (e.g., 128), the network device 101 may cease detection of the first transmission from the terminal device 102 based on the following remaining repetitions (e.g., 78 repetitions).

In some embodiments, the resource reuse may be enabled only when a large number of repetitions are configured for the terminal device 102. For example, at block 230, the network device 101 may identify the resource of the following remaining repetitions as a reusable resource, only if the configured first number of repetitions is no less than a repetition threshold $N_{conf}$ (e.g., $N_{conf}=60$).

Alternatively, or in addition, in another embodiment, the resource reuse may be enabled only if a large number of repetitions are remaining after correct detection of the first transmission. For instance, the network device 101 may identify the resource of the following remaining repetitions as a reusable resource, only if the number of the remaining repetitions is no less than a reuse threshold (e.g., 5).

Optionally, in some embodiments, at block 230, the network device 101 may add the resource for the following remaining repetitions into a resource pool for being reused by the further terminal device. In another embodiment, the network device 101 may use any suitable way for marking the resource as a reusable resource.

Figure 5:
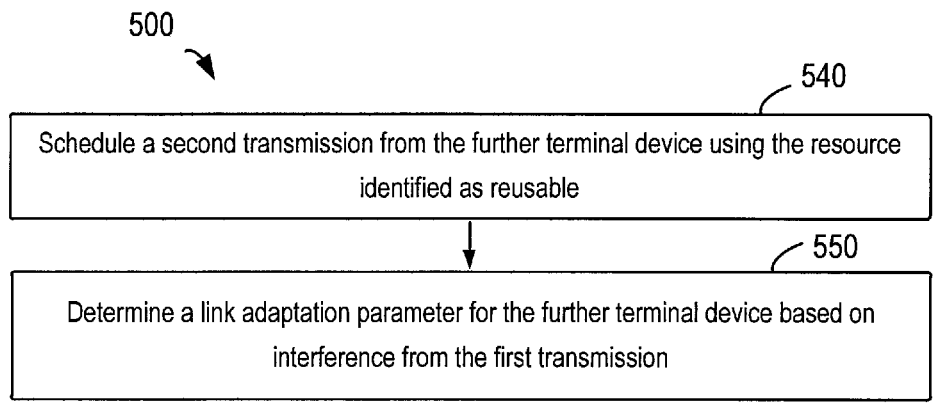
FIG. 5 illustrates a flow chart of optional operations may be performed by a network device according to an embodiment of the present disclosure.

In some embodiments, in addition to blocks 210-230, network device 101 may perform one or more additional optional operations 500 shown in FIG. 5. As an example, at block 540 shown in FIG. 5, network device 101 may schedule a second transmission from the further terminal device (e.g., UE 103 in FIG. 1) using the reusable resource. In this way, the network device may increase the number of wireless communications by reusing the resource of remaining repetitions of terminal device 102.

If the terminal device 103 is scheduled to use the reusable resource, its communication with the terminal device 101 may be subject to interference from the terminal 102, since terminal device 102 continues its repetitive transmission using same resource till the end of the configured first number of repetitions, although the transmission has been detected correctly by the network device 101 earlier. Therefore, in some embodiments, the network device 101 may determine whether terminal device 103 is fit for being scheduled in the reusable resource prior to scheduling it.

Embodiments of the present disclosure are not limited to any specific way for determining at the network device 101 whether terminal device 103 is fit for being scheduled in the reusable resource. For example rather than limitation, at block 540, the network device 101 may determine whether receiving signal quality from the terminal device 103 over the reusable resource is acceptable or not.

In an embodiment, at block 540, the network device 101 may determine whether the further terminal device (e.g., terminal device 103) satisfies a resource reuse condition, based on a first signal power associated with the further terminal device 103 and a second signal power associated with the terminal device 102; and in response to determining that the further terminal device 103 satisfies the resource reuse condition, the network device 101 schedules the further terminal device 103 to transmit using the reusable resource.

In some embodiments, the first signal power may include an average signal power from a first set of terminal devices (e.g., terminal devices 103 and 104) that are served by the network device 101 and have same repetition level as that of the further terminal device 103. Note that the repetition level is associated with the configured number of repetition numbers, or in other words, each repetition level has an associated repetition number. In this example, the average signal power may be considered as a cell level measurement.

Alternatively, or in addition, the second signal power may include an average signal power from a second set of terminal devices (e.g., terminal devices 102 and 105 shown in FIG. 1) that are served by the network device 101 and have same repetition level as that of the terminal device 102.

Considering a NB-IoT system where mobility of a terminal device at a connected state is not supported, if the number of repetitions of an allocated NPUSCH resource unit (RU) is greater than 2, and maximum transmission power is used for NPUSCH transmission (i.e., $P_{NPUSCH,c}(i) = P_{CMAX,c}(i)$), we can assume that at each repetition level associated with same $N_{Rep}$ and SCS ($\Delta f=15$ kHz or 3.75 kHz), the average signal power is relatively stable. Therefore, in some embodiments, cell level measurement of the weighted average signal power shown in equation (1) may be used by the network device 101 to determine whether a terminal device satisfies a resource reuse condition.

$$P_{subcarrier}(i, I_{deltaF}, I_{Rep}) = \begin{cases} P_{subcarrier}(i-1, I_{deltaF}, I_{Rep}) \\ (1-\alpha) * P_{subcarrier}(i-1, I_{deltaF}, I_{Rep}) + \alpha * P_{subcarrier} \end{cases} \quad (1)$$

$$\text{where } I_{deltaF} = \begin{cases} 0 & \Delta f = 15 \text{ kHz} \\ 1 & \Delta f = 3.75 \text{ kHz,} \end{cases}$$

and $I_{Rep}$ may take a value shown in Table 1.

In above equation (1), $P_{subcarrier}(i, I_{deltaF}, I_{Nsc}, I_{Rep})$ represents a cell level measurement of averaged signal power over a scheduled NPUSCH subcarrier by eNB for each repetition assuming same $\Delta f$. If there is no new signal power measurement performed (i.e., $P_{subcarrier}$ in equation (1) is unavailable), the $P_{subcarrier}(i, I_{deltaF}, I_{Nsc}, I_{Rep})$ will be same as previous $P_{subcarrier}(i-1, I_{deltaF}, I_{Nsc}, I_{Rep})$; otherwise, $P_{subcarrier}(i, I_{deltaF}, I_{Nsc}, I_{Rep})$ may be obtained based on a weighted sum of previous $P_{subcarrier}(i-1, I_{deltaF}, I_{Nsc}, I_{Rep})$ and current $P_{subcarrier}$, where $\alpha$ is a configurable weighed factor. Furthermore, if there are multiple signal power measurements with same $\Delta f$ and $N_{Rep}$, $P_{subcarrier}$ may be an average of the multiple signal power measurements. The initial signal power for equation (1) may be defined, for example, as equation (2).

$$P_{subcarrier}(0, I_{deltaF}, I_{Rep}) = \begin{cases} P_{CMAX,c}(i) - 144 \text{ dB} & N_{Rep} <= N_{Rep\text{-}normal} \\ P_{CMAX,c}(i) - 154 \text{ dB} & N_{Rep} <= N_{Rep\text{-}robust} \\ P_{CMAX,c}(i) - 164 \text{ dB} & N_{Rep} <= N_{Rep\text{-}extreme} \end{cases} \quad (2)$$

In some embodiments, both the first signal power associated with the further terminal device 103 and a second signal power associated with the terminal device 102 are obtained based on equation (1).

In a further embodiment, at block 540, the network device 101 may obtain a signal to interference and noise ratio (SINR) of the further terminal device (103), wherein the first transmission from the terminal device 102 is considered as an interference. If the obtained SINR of the further terminal device 103 is above a SINR threshold, the network device 101 determines that the further terminal device 103 satisfies a resource reuse condition; otherwise, the network device 101 determines that the further terminal device 103 does not satisfy the resource reuse condition.

For example, SINR of the further terminal device 103 may be obtained by using equation (3):

$$SINR = 10 * \log_{10} \frac{P_{subcarrier}(i, I_{deltaF}, I_{Rep\_UE1})}{P_{subcarrier}(i, I_{deltaF}, I_{Rep\_UE2}) + \sigma} \quad (3)$$

where $I_{Rep\_UE1}$ and $I_{Rep\_UE2}$ denote the averaged signal power of the further terminal device 103 and the terminal device 102 respectively, and may be obtained, for example, via equation (1).

In some embodiments, the network device may compare the SINR with a SINR threshold $SINR_{Conf}$, which may be configurable by the network device 101, to decide whether the further terminal device 103 is suitable to be scheduled to reuse the resource of terminal device 102. That is, as an example, the resource reuse condition may be defined as below:

$$10 * \log_{10} \frac{P_{subcarrier}(i, I_{deltaF}, I_{Rep\_UE1})}{P_{subcarrier}(i, I_{deltaF}, I_{Rep\_UE2}) + \sigma} > SINR_{Conf} \quad (4)$$

where σ denotes cell level noise measurement.

Optionally, in some embodiments, the network device 101 may perform link adaptation for the terminal device 103 scheduled on the reusable resource by taking interference from the terminal device 102 into consideration. For example, at block 550 of FIG. 5, the network device 101 may determine a link adaptation parameter for the further terminal device 103 based on interference from the first transmission of the terminal device 102. Example of the link adaptation parameter may include, but not limited to, a compensation factor for adjusting a transmission parameter for the further terminal device 103. For instance, the transmission parameter may include a MCS and/or a repetition level for the further terminal device 103.

That is to say, in some embodiments, during link adaptation phase, MCS and/or repetition level for the further terminal device 103 may be compensated by considering interference from the transmission of terminal device 102. For illustration rather than limitation, the compensation factor may be defined as equation (5):

$$\Delta_{LA} = \beta * \left( 10 * \log_{10} \frac{P_{subcarrier}(i, I_{deltaF}, I_{Rep\_UE1})}{\sigma} - 10 * \log_{10} \frac{P_{subcarrier}(i, I_{deltaF}, I_{Rep\_UE1})}{P_{subcarrier}(i, I_{deltaF}, I_{Rep\_UE2}) + \sigma} \right) \quad (5)$$

where the scaling factor β may be configurable per cell level, and the output $\Delta_{LA}$ denotes the compensation factor to be used as an input to LA algorithm. It should be appreciated that exact compensation factor may be configured based on the LA algorithm to be applied, and embodiments are not limited to any specific algorithm for obtaining the compensation factor or performing the LA algorithms.

Figure 6:
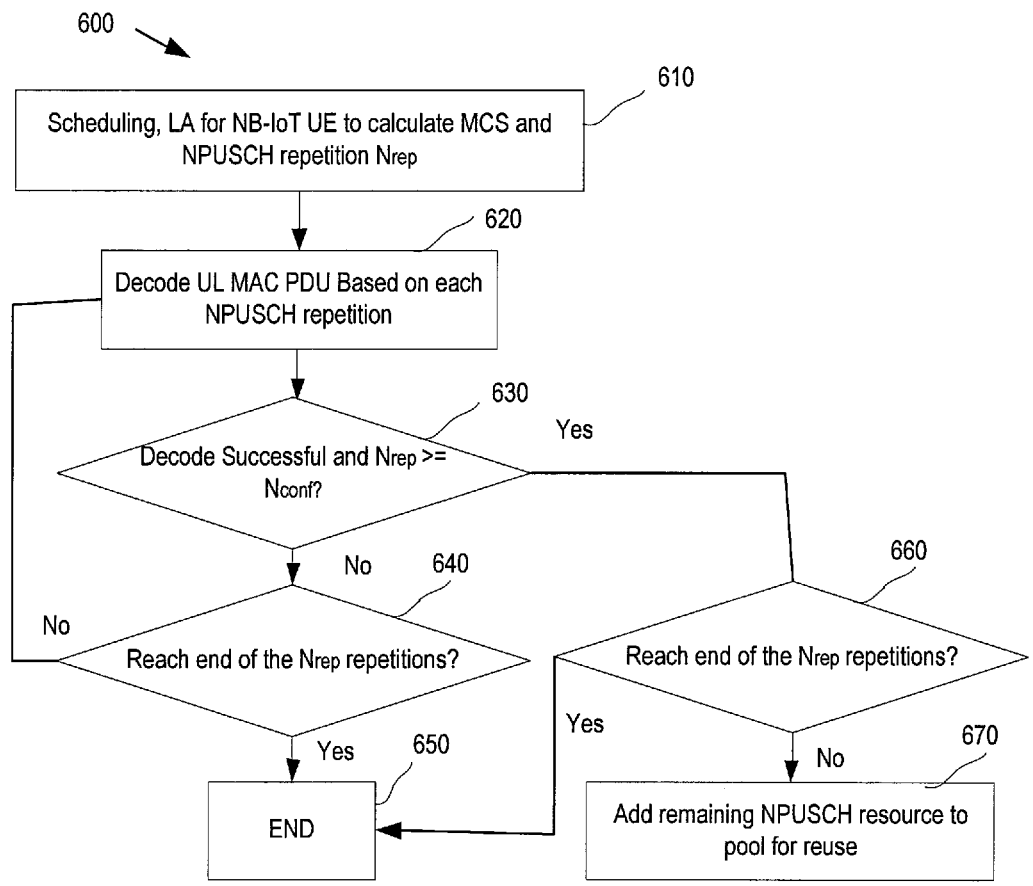
FIGS. 6-8 illustrate flow charts of methods in a network device according to an embodiment of the present disclosure.
Figure 7:
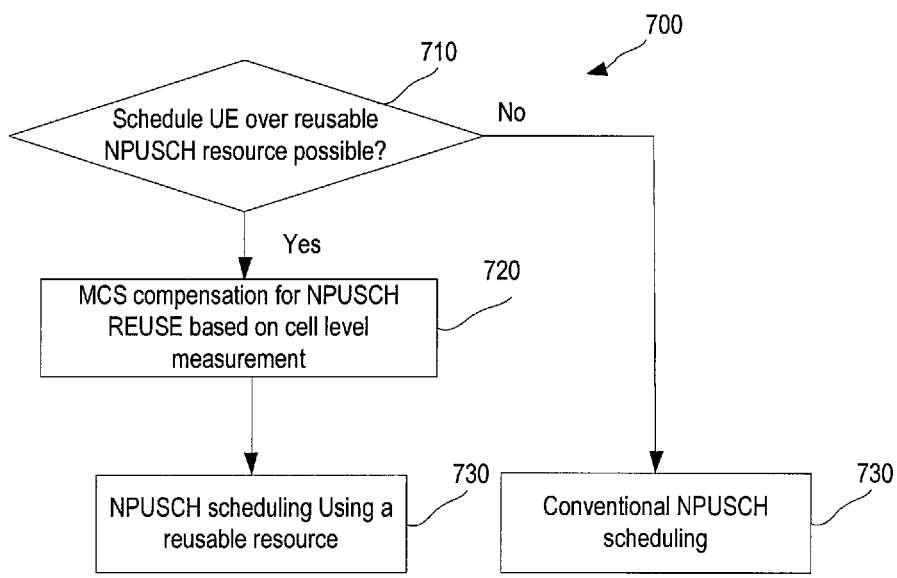
Figure 8:
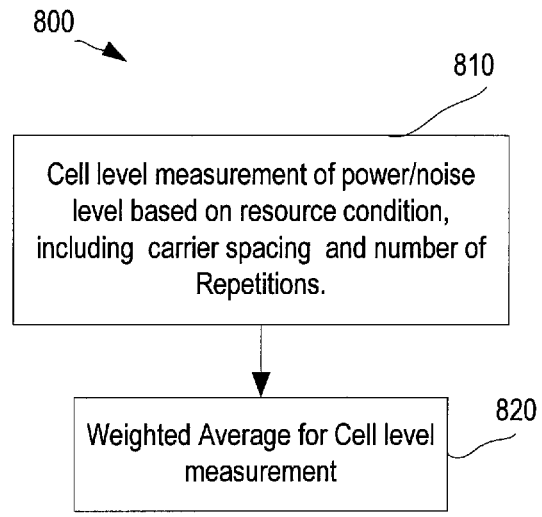

For illustration purpose, FIGS. 6-8 show flow charts of example methods 600-800 at a network device (e.g., network device 101 in FIG. 1) for improving resource efficiency. Methods 600-800 may be considered as example implementations of method 200 shown in FIG. 2. For ease of discussion, methods 600-800 will be described below with reference to network device 101 and the communication network 100 illustrated in FIG. 1. However, embodiments of the present disclosure are not limited thereto.

As shown in FIG. 6, at block 610, the network device 101 schedules a terminal device, for example terminal device 102 shown in FIG. 1. In some embodiments, a conventional scheduler may be used at block 610. For example, the terminal device 102 may be scheduled based on UL BSR, and the scheduling at block 610 may include determining MCS and repetition level (or the number of repetitions) for the scheduled terminal device 102 by invoking a LA algorithm. The network device 101 may performs scheduling on a per TTI basis, for scheduling same or different terminal devices.

During UL scheduling, for a NPUSCH transmission with a configuration of $N_{Rep} > N_{Conf}$ from the terminal device, where $N_{Conf}$ is a configurable parameter, the scheduler of the network device 101 may notify an UL receiver of the network device 101 to decode an UL MAC PDU at the end of each repetition, and from the second repetition, to decode the UL MAC PDU after soft-bit combination for the NPUSCH transmission. Accordingly, at block 620, the network device 101 may detect the NPUSCH transmission from a scheduled terminal device 102 on a per repetition basis.

At block 630, if the network device 101 detects the NPUSCH transmission correctly, and the configured number of repetition $N_{rep}$ is larger than a repetition threshold $N_{Conf}$, i.e, $N_{Rep} > N_{Conf}$, the network device 101 checks, at block 660, whether all the configured $N_{rep}$ repetitions are used for detection. If less than $N_{rep}$ repetitions are used for the detection, at block 670, the network device 101 adds resource for remaining NPUSCH repetitions for the terminal device 102 into a pool for reuse; otherwise, the process end at block 650. If the detection is determined as unsuccessful at block 630, the network device 101 also checks whether all the configured $N_{rep}$ repetitions are detected at block 640. If less than $N_{rep}$ repetitions are used for the detection, the network device 101 continues the detection at block 620; otherwise, the process end at block 650.

Reference is now made to FIG. 7, which shows a flow chart of a method 700 for scheduling a terminal device using a reusable resource. Method 700 may be considered as an example implementation of the optional operations 500 of method 200 shown in FIG. 5. At block 710, the network device 101 checks whether it is possible to schedule a terminal device (e.g., the terminal device 103 shown in FIG. 1) using a reusable resource. In some embodiments, in order to make a reasonable decision at block 710, the network device 101 may perform measurements, for example, the operations 800 shown in FIG. 8.

In the example of FIG. 8, at block 810, the network device 101 obtains cell level measurement of signal power level and/or noise level, based on resource condition, including carrier spacing and number of repetitions of involved terminal devices. At block 820, the network device 101 may obtain a weighted average signal power based on the obtained cell level measurement. For example, Equation (1) may be used for obtaining the weighted result.

The weighted average signal power may be used by the network device 101 at block 710 to determine whether the terminal device 103 is suitable for being scheduled using a reusable resource. For example, the network device 101 may obtain an SINR of the terminal device 101 using Equation (3), and checks whether the terminal device 103 satisfies the resource reuse condition shown in Equation (4), in a similar ways as that described with reference to block 540 of FIG. 5.

If network device 101 determines that the terminal device 103 can be scheduled, it may determine a MCS compensation factor for the terminal device 103 at block 720, based on the cell level measurement. The compensation factor may be determined in a similar way as that described with reference to block 550 of FIG. 5. At block 730, network device 101 schedules the terminal device 103 using the reusable resource. On the other hand, if the network device 101 determines that the terminal device 103 cannot satisfy the resource reuse condition, it may schedule the terminal device 103 in a conventional way at block 740, for example, using a resource not used by terminal device 102, to avoid interference.

Note that the signal detection solutions proposed in the present disclosure do not require any change at the terminal device side. In other words, the terminal device 102 or 103 being scheduled by the network device 101 may still perform its transmission in a conventional way, according to the scheduling information indicated by the network device 101 for example via the DCI. The scheduling information may include, for example, MCS, resource allocation, and a repetition level or the number of repetitions.

Figure 9:
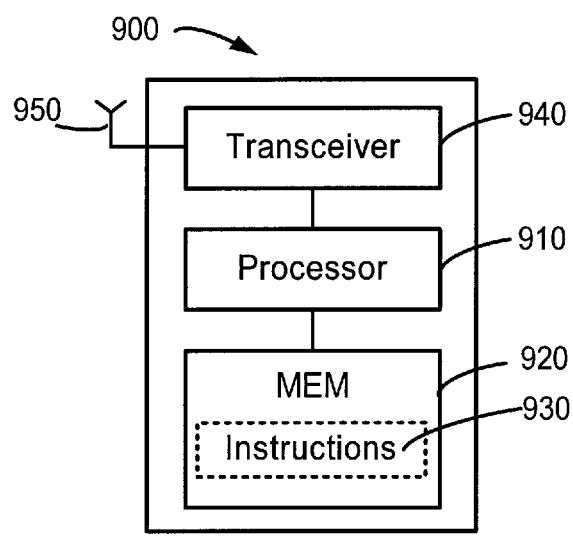
FIG. 9 illustrates a simplified block diagram of an apparatus that may be embodied as/in a network device and an apparatus that may be embodied as/in a terminal device.

FIG. 9 illustrates a simplified block diagram of an apparatus 900 that may be embodied in/as a network device, for example, the network device 101 shown in FIG. 1.

As shown, apparatus 900 comprises a processor 910 which controls operations and functions of apparatus 900. For example, in some embodiments, the processor 910 may implement various operations by means of instructions 930 stored in a memory 920 coupled thereto. The memory 920 may be any suitable type adapted to local technical environment and may be implemented using any suitable data storage technology, such as semiconductor based memory terminal devices, magnetic memory terminal devices and systems, optical memory terminal devices and systems, fixed memory and removable memory, as non-limiting examples. Though only one memory unit is shown in FIG. 9, a plurality of physically different memory units may exist in apparatus 900.

The processor 910 may be any proper type adapted to local technical environment, and may include one or more of general purpose computers, special purpose computers, microprocessors, digital signal processors DSPs and processors based on multicore processor architecture, as non-limiting examples. The apparatus 900 may also comprise a plurality of processors 910.

The processors 910 may also be coupled with a transceiver 940 which enables reception and transmission of information by means of one or more antennae 950 and/or other components. For example, the processor 910 and the memory 920 can operate in cooperation to implement any of the methods 200 and 600-800 described with reference to FIGS. 2-8. It shall be appreciated that all the features described above with reference to FIGS. 2-8 also apply to apparatus 900, and therefore will not be detailed here.

Various embodiments of the present disclosure may be implemented by a computer program or a computer program product executable by one or more of the processors (for example processor 910 in FIG. 9), software, firmware, hardware or in a combination thereof.

Although some of the above description is made in the context of a wireless communication system shown in FIG. 1, it should not be construed as limiting the spirit and scope of the present disclosure. The principle and concept of the present disclosure may be more generally applicable to other scenarios.

In addition, the present disclosure also provides carrier containing the computer instructions 930. The carrier may be computer readable storage medium such as a memory containing the computer program or computer program product as mentioned above. The computer-readable media may include, for example, magnetic disks, magnetic tape, optical disks, phase change memory, or an electronic memory terminal device like a random access memory (RAM), read only memory (ROM), flash memory devices, CD-ROM, DVD, Blue-ray disc and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by a computer program or a computer program product which includes computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. The protection sought herein is as set forth in the claims below.

Some of the abbreviations used in the present disclosure are listed below.
ACK Acknowledgement
DL Downlink
DCI Downlink Control Information
LA Link Adaptation
MCL Maximum Coupling Loss
MCS Modulation and Coding Scheme
MTC Machine Type Communication
NACK Negative Acknowledgement
NB-IoT Narrowband Internet of Things
NPDCCH Narrowband Physical Downlink Control channel
NPDSCH Narrowband Physical Downlink Shared channel
NPRACH Narrowband Physical Random Access channel
NPUSCH Narrowband Physical Uplink Shared channel
PDU Packet Data Unit
PRB Physical Resource Block
PSD Power Spectral Density
RSSI Received Signal Strength Indication
RU Resource Unit
SCS Subcarrier space
TTI Transmission Time Interval
UE User Equipment
UL Uplink

What is claimed is:

1. A method implemented at a network device for configuring transmission, comprising:
    setting, for a terminal device, a first number of repetitions to be used for a first transmission from the terminal device;
    detecting the first transmission from the terminal device based on a second number of repetitions;
    in response to detecting the first transmission correctly based on the second number of repetitions, comparing the second number with the first number;
    in response to the second number being less than the first number, identifying a resource for remaining repetitions after the second number of repetitions of the first transmission as being reusable for a further terminal device;
    determining whether the further terminal device satisfies a resource reuse condition; and,
    in response to determining that the further terminal device satisfies the resource reuse condition, scheduling the further terminal device to transmit the reusable resource.

2. The method of claim 1, further comprising:
    in response to the second number being less than the first number, ceasing detection of the first transmission from the terminal device.

3. The method of claim 1, wherein identifying the resource for the remaining repetitions as being reusable comprises:
    identifying the resource as a reusable resource if the first number is above a first threshold.

4. The method of claim 1, wherein identifying the resource for the remaining repetitions as being reusable comprises:
    identifying the resource as a reusable resource if the number of the remaining repetitions is no less than a second threshold.

5. The method of claim 1, wherein identifying the resource for the remaining repetitions as being reusable comprises:
    adding the resource for the remaining repetitions into a resource pool for being reused by the further terminal device.

6. The method of claim 1, wherein determining whether the further terminal device satisfies the resource reuse condition comprises:
    determining whether the further terminal device satisfies a resource reuse condition based on a first signal power associated with the further terminal device and a second signal power associated with the terminal device.

7. The method of claim 6, wherein the first signal power includes an average signal power from a first set of terminal devices, the first set of terminal devices and the further terminal device being served by the network device and having a same repetition level, and
    wherein the second signal power includes an average signal power from a second set of terminal devices, the second set of terminal devices and the terminal device being served by the network device and having a same repetition level.

8. The method of claim 6, wherein determining whether the further terminal device satisfies the resource reuse condition comprises:
    obtaining a signal to interference and noise ratio, SINR, of the further terminal device, wherein the first transmission from the terminal device is considered as an interference; and,
    in response to the SINR of the further terminal device being above a threshold SINR, determining that the further terminal device satisfies the resource reuse condition.

9. The method of claim 1, further comprising:
    determining a link adaptation parameter for the further terminal device based on interference from the first transmission.

10. The method of claim 9, wherein determining a link adaptation parameter for the further terminal device comprises:
    determining a compensation factor for adjusting a transmission parameter for the further terminal device.

11. The method of claim 10, wherein the transmission parameter for the further terminal device comprises at least one of:
    a modulation and coding scheme; and
    a repetition level.

12. A network device, comprising at least one processor and at least one memory, said memory containing instructions executable by said processor to cause said network device to:

set, for a terminal device, a first number of repetitions to be used for a first transmission from the terminal device;

detect the first transmission from the terminal device based on a second number of repetitions;

in response to detecting the first transmission correctly based on the second number of repetitions, compare a second number with the first number;

in response to the second number being less than the first number, identify a resource for remaining repetitions after the second number of repetition of the first transmission as being reusable for a further terminal device;

determine whether the further terminal device satisfies a resource reuse condition; and, in response to determining that the further terminal device satisfies the resource reuse condition, schedule the further terminal device to transmit using the reusable resource.

13. The network device of claim 12, wherein said memory contains instructions executable by said processor to cause said network device further to:

in response to the second number being less than the first number, cease detection of the first transmission from the terminal device.

14. The network device of claim 12, wherein said memory contains instructions executable by said processor to cause said network device further to mark a resource for following remaining repetitions of the first transmission as a reusable resource by:

identifying the resource as a reusable resource if the first number is above a first threshold.

15. The network device of claim 12, wherein said memory contains instructions executable by said processor to cause said network device further to mark a resource for following remaining repetitions of the first transmission as a reusable resource by:

identifying the resource as a reusable resource if the number of the remaining repetitions is no less than a second threshold.

16. The network device of claim 12, wherein said memory contains instructions executable by said processor to cause said network device further to mark a resource for following remaining repetitions of the first transmission as a reusable resource by:

adding the resource for the remaining repetitions into a resource pool for being reused by the further terminal device.

17. The network device of claim 12, wherein said memory contains instructions executable by said processor to cause said network device further to determine whether the further terminal device satisfies the resource reuse condition by:

determining whether the further terminal device satisfies a resource reuse condition based on a first signal power associated with the further terminal device and a second signal power associated with the terminal device.

18. The network device of claim 17, wherein the first signal power includes an average signal power from a first set of terminal devices, the first set of terminal devices and the further terminal device being served by the network device and having a same repetition level, and wherein the second signal power includes an average signal power from a second set of terminal devices, the second set of terminal devices and the terminal device being served by the network device and having a same repetition level.

19. The network device of claim 17, wherein said memory contains instructions executable by said processor to cause said network device further to determine whether the further terminal device satisfies a resource reuse condition by:

obtaining a signal to interference and noise ratio, SINR, of the further terminal device, wherein the first transmission from the terminal device is considered as an interference; and, in response to the SINR of the further terminal device being above a threshold SINR, determining that the further terminal device satisfies the resource reuse condition.

20. The network device of claim 12, wherein said memory contains instructions executable by said processor to cause said network device further to:

determine a link adaptation parameter for the further terminal device based on interference from the first transmission.

21. The network device of claim 20, wherein said memory contains instructions executable by said processor to cause said network device further to determine a link adaptation parameter for the further terminal device by:

determining a compensation factor for adjusting a transmission parameter for the further terminal device.

22. The network device of claim 21, wherein the transmission parameter for the further terminal device comprises at least one of:

a modulation and coding scheme; and a repetition level.

23. A non-transitory computer readable medium having a computer program stored thereon which, when executed by at least one processor of a network device, causes the network device to:

set, for a terminal device, a first number of repetitions to be used for a first transmission from the terminal device;

detect the first transmission from the terminal device based on a second number of repetitions;

in response to detecting the first transmission correctly based on the second number of repetitions, compare a second number with the first number;

in response to the second number being less than the first number, identify a resource for remaining repetitions after the second number of repetition of the first transmission as being reusable for a further terminal device;

determine whether the further terminal device satisfies a resource reuse condition; and, in response to determining that the further terminal device satisfies the resource reuse condition, schedule the further terminal device to transmit using the reusable resource.

* * * * *